US011990094B1

(12) United States Patent
Fan et al.

(10) Patent No.: US 11,990,094 B1
(45) Date of Patent: May 21, 2024

(54) PIXEL DRIVING CIRCUIT AND DRIVING METHOD THEREFOR, AND DISPLAY PANEL

(71) Applicant: HKC CORPORATION LIMITED, Shenzhen (CN)

(72) Inventors: Tao Fan, Shenzhen (CN); Zhenghui Yuan, Shenzhen (CN); Yun Wang, Shenzhen (CN); Guanqun Li, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/333,050

(22) Filed: Jun. 12, 2023

(30) Foreign Application Priority Data

Nov. 23, 2022 (CN) ........................ 202211470343.5

(51) Int. Cl.
*G09G 3/3233* (2016.01)

(52) U.S. Cl.
CPC ... *G09G 3/3233* (2013.01); *G09G 2300/0852* (2013.01); *G09G 2310/08* (2013.01); *G09G 2320/0223* (2013.01); *G09G 2320/0233* (2013.01); *G09G 2320/0257* (2013.01); *G09G 2320/045* (2013.01)

(58) Field of Classification Search
CPC ......... G09G 3/3233; G09G 2300/0852; G09G 2310/08; G09G 2320/0223; G09G 2320/0233; G09G 2320/0257; G09G 2320/045
See application file for complete search history.

(56) References Cited

U.S. PATENT DOCUMENTS

| | | | | |
|---|---|---|---|---|
| 2018/0033365 A1* | 2/2018 | Zhang | .................. | G09G 3/3233 |
| 2022/0284860 A1* | 9/2022 | Lin | ...................... | G09G 3/3266 |
| 2022/0293890 A1* | 9/2022 | Jeong | .................. | H10K 50/865 |
| 2023/0056897 A1* | 2/2023 | Kim | ...................... | H01L 27/124 |

FOREIGN PATENT DOCUMENTS

| | | |
|---|---|---|
| CN | 203300194 | 11/2013 |
| CN | 104157239 | 11/2014 |
| CN | 105096819 | 11/2015 |
| CN | 106782325 | 5/2017 |
| CN | 114627817 | 6/2022 |

OTHER PUBLICATIONS

CNIPA, First Office Action for CN Application No. 202211470343.5, dated Dec. 30, 2022.
CNIPA, Notification to Grant Patent Right for Invention for CN Application No. 202211470343.5, dated Jan. 30, 2023.

* cited by examiner

*Primary Examiner* — Stacy Khoo
(74) *Attorney, Agent, or Firm* — Hodgson Russ LLP

(57) ABSTRACT

The pixel driving circuit includes a first switching transistor connected to a first control line, a reference power line, and a first node, a second switching transistor connected to a scan line, a data line, and the first node; a driving transistor connected to the first node, a driving power line, and a second node; a first capacitor connected to the first node and a third node; a second capacitor connected to the third node and a cathode of a organic light-emitting diode; a third switching transistor connected to the third node, the second node, and a second control line; and a fourth switching transistor connected to the second node, an anode of the organic light-emitting diode, and a third control line.

3 Claims, 3 Drawing Sheets

PIXEL DRIVING CIRCUIT AND DRIVING METHOD THEREFOR, AND DISPLAY PANEL

ROSS-REFERENCE TO RELATED APPLICATIONS

This application claims priority to Chinese Patent Application 202211470343.5, filed Nov. 23, 2022, the entire disclosure of which is incorporated herein by reference.

TECHNICAL FIELD

The present disclosure belongs to the field of display, and particularly relates to a pixel driving circuit and a driving method therefor, and a display panel.

BACKGROUND

Organic light-emitting diode (OLED) display panels have the advantages of low power consumption, high color gamut, high brightness, high resolution, wide viewing angle, high response speed and the like, thereby being widely used in electronic products such as mobile phones, laptops, and televisions.

According to an existing 2T1C pixel driving circuit, different direct current driving voltages are applied to organic light-emitting diodes, allowing the organic light-emitting diodes to display the desired color and brightness at different grayscale values. In the 2T1C pixel driving circuit, driving transistors are always in a turn-on state, and the organic light-emitting diodes are in a direct current bias state for a long time, so that a threshold voltage will continuously increase with operating time, which means a threshold voltage drift. The threshold voltage drift causes a reduction in a driving current for the organic light-emitting diodes, which in turn causing brightness decay of the organic light-emitting diodes.

SUMMARY

There are provided a pixel driving circuit and a driving method therefor, and a display panel, according to embodiments of the present disclosure. The technical solution is as below:

According to one aspect of the present disclosure, there is provided a pixel driving circuit, including an organic light-emitting diode, wherein the pixel driving circuit further includes:

- a first switching transistor, having a control end connected to a first control line, a first end connected to a reference power line, and a second end connected to a first node;
- a second switching transistor, having a control end configured to be connected to a scan line, a first end configured to be connected to a data line, and a second end connected to the first node;
- a driving transistor, having a control end connected to the first node, a first end connected to a driving power line, and a second end connected to a second node;
- a first capacitor, connected to the first node and a third node;
- a second capacitor, connected to the third node and a cathode of the organic light-emitting diode;
- a third switching transistor, having a first end and a second end connected to the third node and the second node in a one-to-one correspondence manner, and a control end connected to a second control line; and
- a fourth switching transistor, having a first end and a second end connected to the second node and an anode of the organic light-emitting diode in a one-to-one correspondence manner, and a control end connected to a third control line.

According to a second aspect of the present disclosure, there is provided a driving method for a pixel driving circuit. The driving method for a pixel driving circuit is used for the pixel driving circuit. The driving method for a pixel driving circuit includes:

- in a sampling stage, controlling the first switching transistor and the third switching transistor to be turned on, and controlling the second switching transistor and the fourth switching transistor to be turned off, to charge the first capacitor and the second capacitor;
- in a data writing stage, controlling the second switching transistor to be turned on, and controlling the first switching transistor, the third switching transistor, and the fourth switching transistor to be turned off, allowing a signal from the data line to be written into the first capacitor and the second capacitor through the second switching transistor; and
- in a light emitting stage, controlling the third switching transistor and the fourth switching transistor to be turned on, and controlling the first switching transistor and the second switching transistor to be turned off, allowing a driving current to flow through the organic light-emitting diode to make the organic light-emitting diode emit light.

According to a third aspect of the present disclosure, there is provided a display panel, including:

- a pixel driving circuit;
- a scan line, connected to a control end of the second switching transistor; and
- a data line, connected to a first end of the second switching transistor.

In the present disclosure, a driving current $I_{OLED}$ for the organic light-emitting diode in the pixel driving circuit is controlled by a voltage $V_{DATA}$ of the data line and a voltage $V_{ref}$ of the reference power line, without being affected by a threshold voltage, and even if threshold voltage drifts of different subpixels are different, the driving current and the brightness of the organic light-emitting diode are same, that is, the problem of uneven display caused by threshold voltage drift is eliminated.

Other features and advantages of the present disclosure will become apparent through the detailed description below, or partially learned through the practice of the present disclosure.

It should be understood that the general description above and the detailed description below are only exemplary and explanatory, and cannot limit the present disclosure.

BRIEF DESCRIPTION OF THE DRAWINGS

The accompanying drawings herein are incorporated into the specification, constitute part of this specification, show the embodiments consistent with the present disclosure, and are used together with the specification to explain the principle of the present disclosure. Apparently, the accompanying drawings in the description below merely illustrate some embodiments of the present disclosure. Those of ordinary skill in the art may also derive other accompanying drawings from these accompanying drawings without creative efforts.

DETAILED DESCRIPTION OF THE EMBODIMENTS

The exemplary embodiments will now be described more fully with reference to the accompanying drawings. However, the exemplary embodiments can be implemented in various forms and should not be understood to be limited to the examples elaborated herein; and rather, these embodiments are provided so that the present disclosure will be more comprehensive and complete, and the concept of the exemplary embodiments will be fully communicated to those skilled in the art.

In addition, the features, structures, or characteristics described may be combined in any suitable way in one or more embodiments. In the description below, many specific details are provided to give a full understanding of the embodiments of the present disclosure. However, those skilled in the art will realize that the technical solution of the present disclosure may be practiced without one or more specific details, or other methods, components, devices, steps, etc. may be employed. In other cases, the well-known methods, devices, implementations, or operations are not shown or described in detail to avoid blurring various aspects of the present disclosure.

The present disclosure is further described in detail below in conjunction with the accompanying drawings and the specific embodiments. Herein, it should be noted that the technical features involved in the embodiments of the present disclosure described below may be combined with each other as long as they do not conflict with each other. The embodiments described below with reference to the accompanying drawings are exemplary, are intended to explain the present disclosure, and should not be construed as a limitation to the present disclosure.

Embodiment 1

Figure 1:
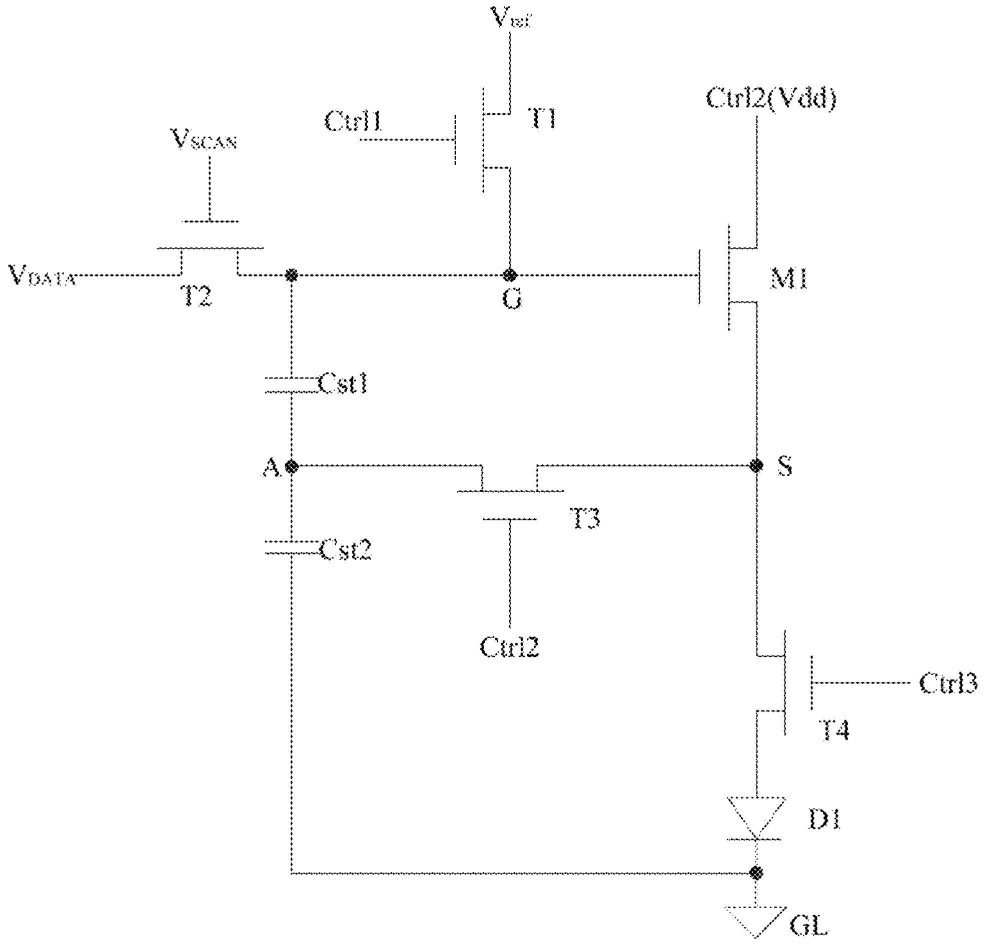
FIG. 1 is a schematic diagram of a pixel driving circuit in Embodiment 1.
Figure 2:
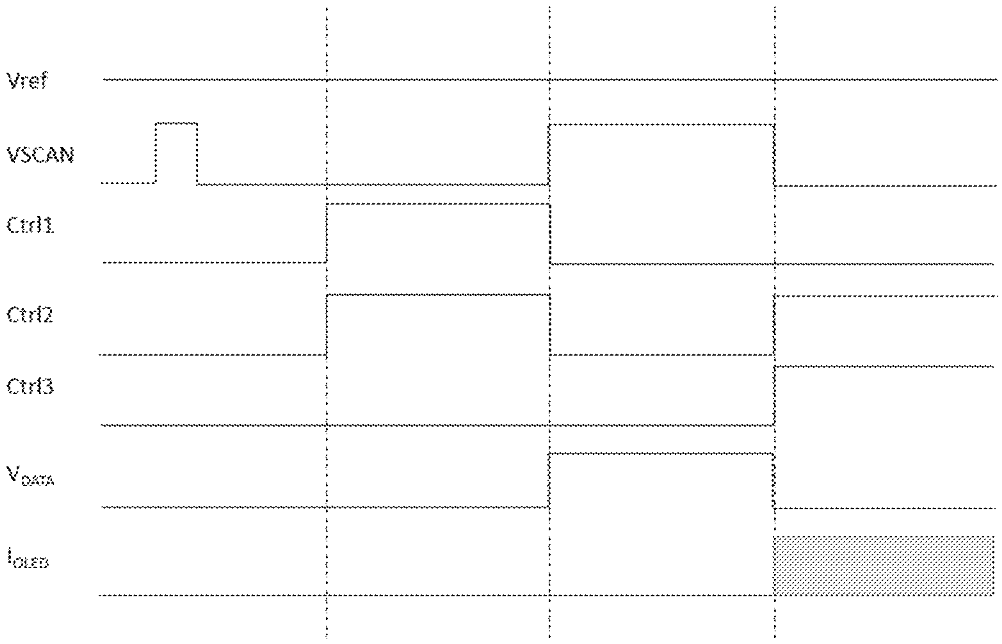
FIG. 2 is an operating time sequence diagram of a pixel driving circuit in Embodiment 1.

As shown in FIG. 1 and FIG. 2, a pixel driving circuit includes an organic light-emitting diode D1, a driving transistor M1, a first switching transistor T1, a second switching transistor T2, a third switching transistor T3, a fourth switching transistor T4, a first capacitor Cst1, and a second capacitor Cst2.

The first switching transistor T1 has a control end connected to a first control line Ctr1, a first end connected to a reference power line that provides a reference voltage $V_{ref}$, and a second end connected to a first node G. The second switching transistor T2 has a control end configured to be connected to a scan line SCAN, a first end configured to be connected to a data line DATA, and a second end connected to the first node G. The driving transistor M1 has a control end connected to the first node G, a first end connected to a driving power line that provides a power voltage Vdd, and a second end connected to a second node S.

The first capacitor Cst1 is connected to the first node G and a third node A, and the second capacitor Cst2 is connected to the third node A and a cathode of the organic light-emitting diode D1. The third switching transistor T3 has a first end and a second end connected to the third node A and the second node S in a one-to-one correspondence manner, and a control end connected to a second control line Ctr2. The fourth switching transistor T4 has a first end and a second end connected to the second node S and an anode of the organic light-emitting diode D1 in a one-to-one correspondence manner, and a control end connected to a third control line Ctr3.

In the pixel driving circuit, the control ends of the driving transistor M1, the first switching transistor T1, the second switching transistor T2, the third switching transistor T3, and the fourth switching transistor T4 are gates, and ones of the first ends and the second ends thereof are sources, while the others of the first ends and the second ends thereof are drains. Specifically, the ends may be set according to types of the driving transistor and the switching transistors.

In this embodiment, when the organic light-emitting diode D1 emits light, a driving current $I_{OLED}$ thereof is as follows:

$$I_{OLED} = \frac{1}{2} \times \mu \times \frac{W}{L} \times C_{GI} \times \left( \frac{C_2}{C_1 + C_2}(V_{DATA} - V_{ref}) \right)^2,$$

wherein $C_1$ is a capacitance of the first capacitor Cst1, $C_2$ is a capacitance of the second capacitor Cst2, μ is carrier mobility, W is a channel width, L is a channel length, $C_{G1}$ is a gate capacitor, $V_{DATA}$ is a voltage of the data line DATA, and $V_{ref}$ is a reference voltage of the reference power line.

In a 2T1C pixel driving circuit, a driving current $I_{OLED}$ for the organic light-emitting diode D1 is as follows:

$$I_{OLED} = \frac{1}{2} \times \mu \times \frac{W}{L} \times C_{GI} \times (V_{DATA} - Vdd - V_{th})^2,$$

wherein Vdd is a voltage of a driving power supply, and $V_{th}$ is a threshold voltage.

The carrier mobility μ, the channel width W, the channel length L, and the gate capacitor $C_{G1}$ are related to a material and structure of the driving transistor M1. The capacitances $C_1$ and $C_2$ are determined by the capacitors, and the voltage $V_{DATA}$ of the data line and the voltage $V_{ref}$ of the reference power line are determined by the data line DATA and the reference power line, respectively. In other words, compared with the 2T1C pixel driving circuit, the pixel driving circuit in this embodiment has the advantages that the driving current $I_{OLED}$ in the pixel driving circuit is controlled by the voltage $V_{DATA}$ of the data line and the voltage $V_{ref}$ of the reference power line, without being affected by the threshold voltage of the driving transistor M1, and even if threshold voltage drifts of different subpixels are different, the driving current and the brightness of the organic light-emitting diode D1 are same, that is, the problem of uneven display caused by threshold voltage drift is eliminated.

In addition, the driving current $I_{OLED}$ in the 2T1C pixel driving circuit is affected by the voltage of the driving power supply. The driving power line itself has a certain internal resistance R, so that the voltage Vdd of the driving power supply that is actually transmitted to the organic light-emitting diode D1 is $Vdd-I_{OLED}\times R$. Voltage drop of the driving power supply is also one of the causes for the uneven brightness of the organic light-emitting diode D1.

In this embodiment, the driving current $I_{OLED}$ in the pixel driving circuit is controlled by the voltage $V_{DATA}$ of the data line and the voltage $V_{ref}$ of the reference power line, without being affected by the voltage Vdd of the driving power supply, while the voltage $V_{ref}$ of the reference power line is only used to supply power to the gate of the driving transistor M1, so that the current is low and the voltage drop generated is small, that is, in this embodiment, the pixel driving circuit eliminates the influence of the voltage drop of the driving power supply and improves the problem of uneven display caused by the voltage drop of the driving power supply.

In some embodiments, the capacitance of the first capacitor Cst1 is equal to the capacitance of the second capacitor Cst2, that is, $C_1=C_2$. When the organic light-emitting diode D1 emits light, a driving current $I_{OLED}$ thereof is as follows:

$$I_{OLED} = \frac{1}{8} \times \mu \times \frac{W}{L} \times C_{GI} \times (V_{DATA} - V_{ref})^2.$$

When the capacitance of the first capacitor Cst1 is equal to the capacitance of the second capacitor Cst2, the driving current $I_{OLED}$ of the organic light-emitting diode is controlled by the voltage $V_{DATA}$ of the data line and the voltage $V_{ref}$ of the reference power line, without being affected by the capacitance of the first capacitor Cst1 and the capacitance of the second capacitor Cst2, which may reduce uneven display caused by a difference in the storage capacitor.

As shown in FIG. 1, the driving power line is connected to an alternating current power supply, that is, in the pixel driving circuit according to this embodiment, the driving power supply is an alternating current.

In the 2T1C pixel driving circuit, the driving power supply has a voltage being Vdd and is a direct current, and the organic light-emitting diode D1 is in a direct current bias state for a long time, resulting in accelerated aging of the organic light-emitting diode D1. In this embodiment, the driving power supply is the alternating current, which may prevent the organic light-emitting diode D1 from being in the direct current bias state for a long time, and may extend the life of the organic light-emitting diode D1 to a certain extent.

It should be noted that the driving power line may be connected to the alternating current power supply, but is not limited thereto. The driving power line may also be connected to a direct current power supply, depending on the situation.

As shown in FIG. 1, the driving power line is the second control line Ctr2. In this embodiment, the driving power supply is the alternating current and has the same time sequence as a control signal of the second control line Ctr2. Therefore, the driving power line and the second control line Ctr2 may share a line, which may reduce the space occupied by the driving power line.

It should be noted that the driving power line and the second control line Ctr2 may share a line, but are not limited thereto. The driving power line and the second control line Ctr2 may also be arranged separately, depending on the situation.

As shown in FIG. 1, the first switching transistor T1, the second switching transistor T2, the third switching transistor T3, and the fourth switching transistor T4 are all N-type switching transistors.

When the driving power line and the second control line Ctr2 share a line, the driving power supply and the control signal of the second control line Ctr2 need to be synchronized in time sequence, and the second control line Ctr2 controls the third transistor T3. When the second control line Ctr2 outputs a high level, the third transistor T3 is turned on, and when the second control line Ctr2 outputs a low level, the third transistor T3 is turned off. In other words, the third transistor T3 is the N-type switching transistor. When the third transistor T3 is the N-type switching transistor, the first switching transistor T1, the second switching transistor T2, and the fourth switching transistor T4 are all the N-type switching transistors, which may simplify the pixel driving circuit and reduce the manufacturing cost of a display panel.

As shown in FIG. 1, the cathode of the organic light-emitting diode D1 is connected to the ground wire GL, and the second capacitor Cst2 is connected to the cathode of the organic light-emitting diode D1, that is, one end of the second capacitor Cst2 is grounded.

One end of the second capacitor Cst2 is grounded, which may remove residual charge of the second capacitor Cst2, and prevent residual charge of a previous frame from affecting a next frame, thereby improving the problems of uneven display, flicker, residual images and the like of the display panel.

Embodiment 2

Figure 3:
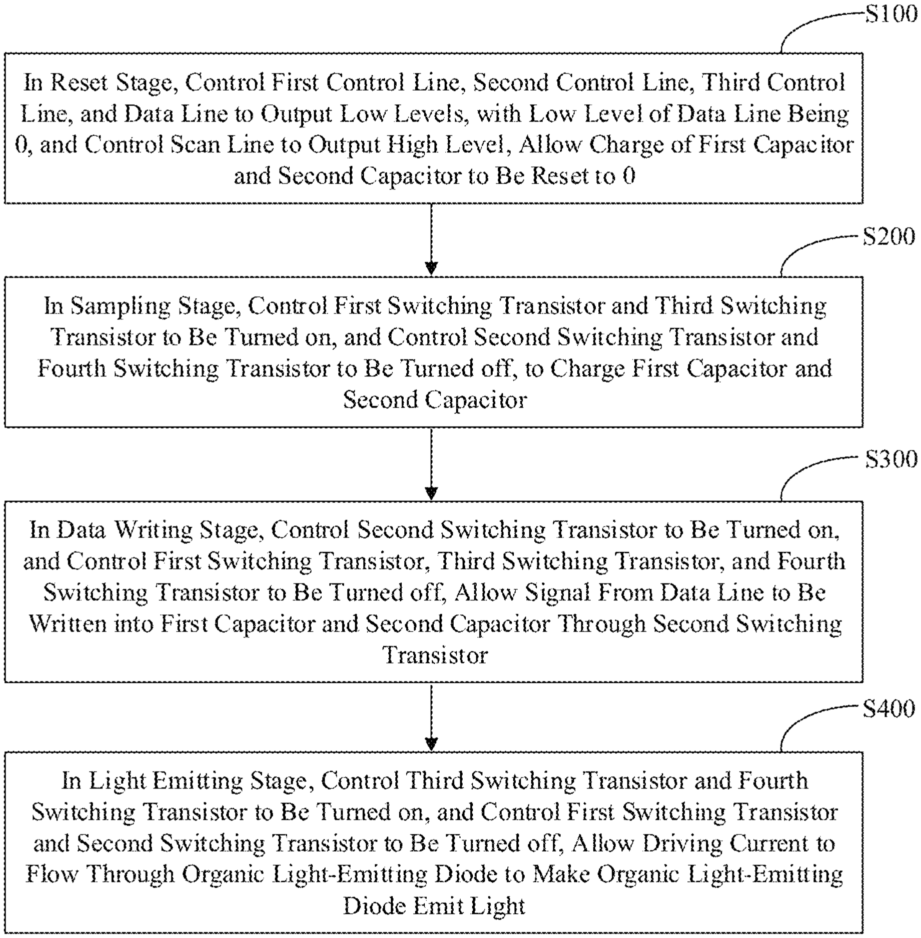
FIG. 3 is a schematic diagram of a driving method for a pixel driving circuit in Embodiment 2 of the present disclosure.

In Embodiment 2, a driving method for a pixel driving circuit is used for the pixel driving circuit in Embodiment 1. As shown in FIG. 3, the driving method for a pixel driving circuit includes:

S200: in a sampling stage, controlling the first switching transistor T1 and the third switching transistor T3 to be turned on, and controlling the second switching transistor T2 and the fourth switching transistor T4 to be turned off, to charge the first capacitor Cst1 and the second capacitor Cst2;

S300: in a data writing stage, controlling the second switching transistor T2 to be turned on, and controlling the first switching transistor T1, the third switching transistor T3, and the fourth switching transistor T4 to be turned off, allowing a signal from the data line DATA to be written into the first capacitor Cst1 and the second capacitor Cst2 through the second switching transistor T2; and

S400: in a light emitting stage, controlling the third switching transistor T3 and the fourth switching transistor T4 to be turned on, and controlling the first switching transistor T1 and the second switching transistor T2 to be turned off, allowing a driving current to flow through the organic light-emitting diode D1 to make the organic light-emitting diode emit light.

In the sampling stage, after the first switching transistor T1 and the third switching transistor T3 are turned on, the current flows through the driving transistor M1, and the first capacitor Cst1 and the second capacitor Cst2 are charged by the third switching transistor T3 until a stable critical point is reached. In this case, $$V_{GS}=V_{C1}=V_G-V_S=V_{th},$$

wherein $V_{GS}$ is a voltage difference between the first node G and the second node S, $V_{C1}$ is a voltage at two ends of the first capacitor Cst1, $V_G$ and $V_S$ are a voltage of the first node G and a voltage of the second node S, respectively, and $V_{th}$ is a threshold voltage of the driving transistor M1. A voltage $V_A$ of the third node A is as follows:

$$V_A=V_S=V_{ref}-V_{th}.$$

In the data writing stage, the second switching transistor T2 is turned on, and a data voltage is written by the second switching transistor T2. According to the capacitive coupling effect, a voltage $V_A$ of the third node A may be as follows:

$$V_A = V_{ref} - V_{th} + \frac{C_2}{C_1 + C_2}(V_{DATA} - V_{ref}).$$

Due to $V_G = V_{DATA}$ in this case, the voltage $V_{C1}$ of the first capacitor Cst1 may be expressed as:

$$V_{C1} = V_G - V_A = V_{th} + \frac{C_2}{C_1 + C_2}(V_{DATA} - V_{ref}).$$

In the light emitting stage, the third switching transistor T3 and the fourth switching transistor T4 are turned on, and the driving current flows through the organic light-emitting diode D1 to make the organic light-emitting diode emit light. The driving current $I_{OLED}$ may be expressed as:

$$\begin{aligned} I_{OLED} &= \frac{1}{2} \times \mu \times \frac{W}{L} \times C_{GI} \times (V_{GS} - V_{th})^2 \\ &= \frac{1}{2} \times \mu \times \frac{W}{L} \times C_{GI} \times (V_{C1} - V_{th})^2 \\ &= \frac{1}{2} \times \mu \times \frac{W}{L} \times C_{GI} \times \left(V_{th} + \frac{C_2}{C_1 + C_2}(V_{DATA} - V_{ref}) - V_{th}\right)^2 \\ &= \frac{1}{2} \times \mu \times \frac{W}{L} \times C_{GI} \times \left(\frac{C_2}{C_1 + C_2}(V_{DATA} - V_{ref})\right)^2 \circ. \end{aligned}$$

As shown in FIG. 2, the first switching transistor T1, the second switching transistor T2, the third switching transistor T3, and the fourth switching transistor T4 are all N-type switching transistors, and the driving power line is the second control line Ctr2. The driving method for a pixel driving circuit includes:

in the sampling stage, controlling the first control line Ctr1 and the second control line Ctr2 to output high levels, and controlling the third control line Ctr3, the scan line SCAN, and the data line DATA to output low levels;

in the data writing stage, controlling the first control line Ctr1, the second control line Ctr2, and the third control line Ctr3 to output low levels, and controlling the scan line SCAN and the data line DATA to output high levels; and in the light emitting stage, controlling the second control line Ctr2 and the third control line Ctr3 to output high levels, and controlling the first control line Ctr1, the scan line SCAN, and the data line DATA to output low levels.

The driving power supply is the alternating current and has the same time sequence as the control signal of the second control line Ctr2. Therefore, the driving power line and the second control line Ctr2 may share a line, which may reduce the space occupied by the driving power line.

As shown in FIG. 1 to FIG. 3, a cathode of the organic light-emitting diode D1 is connected to a ground wire GL; and prior to the sampling stage, the driving method for a pixel driving circuit includes:

S100: in a reset stage, controlling the first control line Ctr1, the second control line Ctr2, the third control line Ctr3, and the data line DATA to output low levels, with a low level of the data line being 0, and controlling the scan line SCAN to output a high level for a period of time, allowing charge of the first capacitor Cst1 and the second capacitor Cst2 to be reset to 0.

In the reset stage, the charge of the first capacitor Cst1 and the second capacitor Cst2 is reset to 0, which may remove residual charge of the storage capacitor, and prevent residual charge of a previous frame from affecting a next frame, thereby improving the problems of uneven display, flicker, residual images and the like of a display panel.

Figure 4:
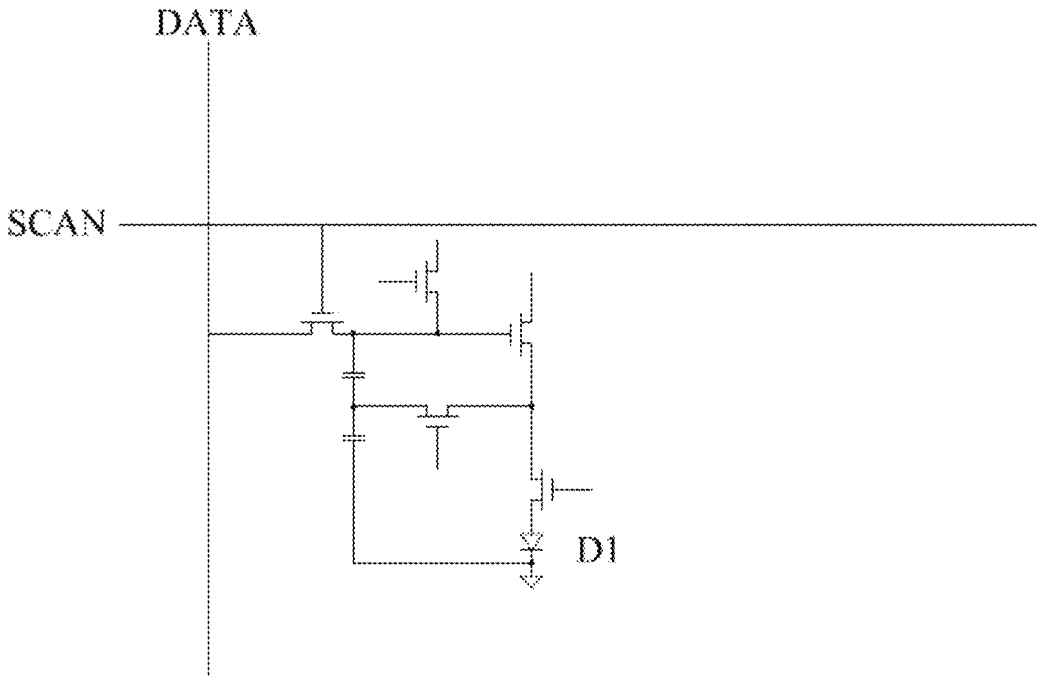
FIG. 4 is a structural schematic diagram of a display panel in Embodiment 4 of the present disclosure.

As shown in FIG. 4, the display panel includes a scan line SCAN, a data line DATA, and the pixel driving circuit disclosed in Embodiment 1. The scan line SCAN is connected to a control end of the second switching transistor T2, and the data line DATA is connected to a first end of the second switching transistor T2.

The display panel includes the pixel driving circuit. A driving current $I_{OLED}$ for the organic light-emitting diode D1 in the pixel driving circuit is controlled by a voltage $V_{DATA}$ of the data line and a voltage $V_{ref}$ of the reference power line, without being affected by a threshold voltage of the driving transistor M1, and even if threshold voltage drifts of different subpixels are different, the driving current and the brightness of the organic light-emitting diode D1 are same, that is, the problem of uneven display caused by threshold voltage drift is eliminated.

In the present disclosure, a driving current $I_{OLED}$ for the organic light-emitting diode in the pixel driving circuit is controlled by a voltage $V_{DATA}$ of the data line and a voltage $V_{ref}$ of the reference power line, without being affected by a threshold voltage, and even if threshold voltage drifts of different subpixels are different, the driving current and the brightness of the organic light-emitting diode are same, that is, the problem of uneven display caused by threshold voltage drift is eliminated.

The terms such as "first" and "second" are only used for descriptive purposes, and cannot be construed as indicating or implying relative importance or implying the number of technical features indicated. Thus, the features defined with "first" and "second" may explicitly or implicitly include one or more of the features. In the description of the present disclosure, "a plurality of" means two or more, unless otherwise expressly and specifically defined.

In the present invention, the terms such as "assembly" and "connection" should be understood in a broad sense, unless otherwise expressly specified and defined. For example, "connection" may be fixed connection, detachable connection, or integrated connection; "connection" may be mechanical connection or electrical connection; and "connection" may be direct connection, indirect connection via an intermediate medium, internal connection between two elements, or interaction between two elements. Those of ordinary skill in the art may understand specific meanings of the above terms in the present disclosure according to specific circumstances.

In the description of this specification, the description with reference to the terms such as "some embodiments" and "examples" means that the specific features, structures, materials or characteristics described in combination with the embodiments or examples are included in at least one embodiment or example of the present disclosure. In this specification, the schematic representations of the above terms do not necessarily refer to the same embodiments or examples. Moreover, the specific features, structures, materials or characteristics described may be combined in a suitable way in any one or more embodiments or examples. In addition, those skilled in the art may combine different embodiments or examples described in this specification and features of different embodiments or examples, without mutual contradiction.

Although the embodiments of the present disclosure have been shown and described above, it may be understood that the above embodiments are exemplary and cannot be understood as a limitation to the present disclosure. Those of ordinary skill in the art may make changes, modifications, substitutions, and modifications to the above embodiments within the scope of the present disclosure. Therefore, any changes or modifications made in accordance with the claims and specification of the present disclosure should fall within the scope of the patent disclosure.

What is claimed is:

1. A driving method for a pixel driving circuit, wherein the driving method for a pixel driving circuit is used for the pixel driving circuit comprising an organic light-emitting diode, wherein the pixel driving circuit further comprises:

a first switching transistor, having a control end connected to a first control line, a first end connected to a reference power line, and a second end connected to a first node;

a second switching transistor, having a control end configured to be connected to a scan line, a first end configured to be connected to a data line, and a second end connected to the first node;

a driving transistor, having a control end connected to the first node, a first end connected to a driving power line, and a second end connected to a second node;

a first capacitor, connected to the first node and a third node;

a second capacitor, connected to the third node and a cathode of the organic light-emitting diode;

a third switching transistor, having a first end and a second end connected to the third node and the second node in a one-to-one correspondence manner, and a control end connected to a second control line; and a fourth switching transistor, having a first end and a second end connected to the second node and an anode of the organic light-emitting diode in a one-to-one correspondence manner, and a control end connected to a third control line, wherein the driving power line is connected to an alternating current power supply and the driving power line is the second control line;

wherein the driving method for a pixel driving circuit comprises:

in a sampling stage, controlling the first switching transistor and the third switching transistor to be turned on, and controlling the second switching transistor and the fourth switching transistor to be turned off, to charge the first capacitor and the second capacitor;

in a data writing stage, controlling the second switching transistor to be turned on, and controlling the first switching transistor, the third switching transistor, and the fourth switching transistor to be turned off, allowing a signal from the data line to be written into the first capacitor and the second capacitor through the second switching transistor; and in a light emitting stage, controlling the third switching transistor and the fourth switching transistor to be turned on, and controlling the first switching transistor and the second switching transistor to be turned off, allowing a driving current to flow through the organic light-emitting diode to make the organic light-emitting diode emit light.

2. The driving method for a pixel driving circuit according to claim 1, wherein the first switching transistor, the second switching transistor, the third switching transistor, and the fourth switching transistor are all N-type switching transistors, and the driving power line is the second control line; and the driving method for a pixel driving circuit comprises:

in the sampling stage, controlling the first control line and the second control line to output high levels, and controlling the third control line, the scan line, and the data line to output low levels;

in the data writing stage, controlling the first control line, the second control line, and the third control line to output low levels, and controlling the scan line and the data line to output high levels; and in the light emitting stage, controlling the second control line and the third control line to output high levels, and controlling the first control line, the scan line, and the data line to output low levels.

3. The driving method for a pixel driving circuit according to claim 2, wherein a cathode of the organic light-emitting diode is connected to a ground wire; and prior to the sampling stage, the driving method for a pixel driving circuit comprises:

in a reset stage, controlling the first control line, the second control line, the third control line, and the data line to output low levels, with a low level of the data line being 0, and controlling the scan line to output a high level, allowing charge of the first capacitor and the second capacitor to be reset to 0.

* * * * *